US012490765B2

(12) United States Patent
Ahn et al.

(10) Patent No.: US 12,490,765 B2
(45) Date of Patent: Dec. 9, 2025

(54) WRAPPER FOR AEROSOL GENERATING ARTICLE AND METHOD OF MANUFACTURING SAME

(71) Applicant: KT&G CORPORATION, Daejeon (KR)

(72) Inventors: Ki-Jin Ahn, Daejeon (KR); Jong Yeol Kim, Sejong (KR); Soo Ho Kim, Chungcheongbuk-do (KR); Kyengbae Ma, Incheon (KR); Man Seok Seo, Seoul (KR); Jin Chul Yang, Sejong (KR); Bong Su Cheong, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 608 days.

(21) Appl. No.: 17/775,452

(22) PCT Filed: Oct. 13, 2021

(86) PCT No.: PCT/KR2021/014129

§ 371 (c)(1),
(2) Date: May 9, 2022

(87) PCT Pub. No.: WO2022/080861

PCT Pub. Date: Apr. 21, 2022

(65) Prior Publication Data

US 2022/0386686 A1 Dec. 8, 2022

(30) Foreign Application Priority Data

Oct. 15, 2020 (KR) ........................ 10-2020-0133740

(51) Int. Cl.

*A24D 1/02* (2006.01)
*A24D 1/04* (2006.01)
*B31F 5/04* (2006.01)

(52) U.S. Cl.

CPC ............... *A24D 1/02* (2013.01); *A24D 1/045* (2013.01); *B31F 5/04* (2013.01)

(58) Field of Classification Search

CPC .................................... A24D 1/02; B31F 5/04
See application file for complete search history.

(56) References Cited

U.S. PATENT DOCUMENTS 5,415,186 A 5/1995 Casey, III et al.
6,457,475 B1 10/2002 Tani et al.
(Continued)

FOREIGN PATENT DOCUMENTS

CN 1072576 A 6/1993
CN 110049690 A 7/2019
(Continued)

OTHER PUBLICATIONS

Office Action issued Sep. 26, 2023 in Japanese Application No. 2022-534307.

(Continued)

*Primary Examiner* — Philip Y Louie
*Assistant Examiner* — Nicole A Szumigalski
(74) *Attorney, Agent, or Firm* — Sughrue Mion, PLLC

(57) ABSTRACT

A method of manufacturing a wrapper for an aerosol generating article includes applying an adhesive to one surface of a metal layer and attaching a first paper layer thereto, applying the adhesive to the other surface of the metal layer and attaching thereto a second paper layer different from the first paper layer, and drying the adhesive applied between the metal layer and the first paper layer and the adhesive applied between the metal layer and the second paper layer.

12 Claims, 10 Drawing Sheets

(56) References Cited

U.S. PATENT DOCUMENTS

| | | | | |
|---|---|---|---|---|
| 2013/0019888 | A1 | 1/2013 | Tsuruizumi et al. | |
| 2015/0157052 | A1* | 6/2015 | Ademe | A24D 1/22 131/58 |
| 2017/0055576 | A1 | 3/2017 | Beeson et al. | |
| 2019/0174814 | A1* | 6/2019 | Mishra | A24B 15/16 |
| 2019/0313691 | A1 | 10/2019 | Kadiric et al. | |
| 2021/0022390 | A1 | 1/2021 | England | |
| 2021/0030056 | A1 | 2/2021 | Hwang et al. | |
| 2021/0060890 | A1* | 3/2021 | Tsai | B31D 5/0095 |
| 2021/0235747 | A1* | 8/2021 | Iwanaga | A24C 5/01 |
| 2022/0117290 | A1* | 4/2022 | Han | A24B 15/167 |

FOREIGN PATENT DOCUMENTS

| | | | | |
|---|---|---|---|---|
| CN | 111629611 | A | 9/2020 | |
| JP | 2004-72038 | A | 3/2004 | |
| KR | 1996-0006812 | A | 3/1996 | |
| KR | 2001-0080901 | A | 8/2001 | |
| KR | 10-2015-0119722 | A | 10/2015 | |
| KR | 10-2018-0044407 | A | 5/2018 | |
| KR | 10-2020-0075861 | A | 6/2020 | |
| WO | 99/34697 | A1 | 7/1999 | |
| WO | 2013/145245 | A1 | 10/2013 | |
| WO | 2015/046199 | A1 | 4/2015 | |
| WO | 2017/040608 | A2 | 3/2017 | |
| WO | WO-2019101623 | A1 * | 5/2019 | A24D 1/02 |
| WO | WO-2020115897 | A1 * | 6/2020 | A24B 15/12 |
| WO | 2020/153829 | A1 | 7/2020 | |

OTHER PUBLICATIONS

International Search Report for PCT/KR2021/014129 dated, Jan. 24, 2022 (PCT/ISA/210).

Written Opinion of the International Searching Authority for PCT/KR2021/014129 dated, Jan. 24, 2022 (PCT/ISA/237).

Extended European Search Report dated Oct. 25, 2022 in European Application No. 21880508.3.

Chinese Office Action dated Nov. 16, 2022 in Chinese Application No. 202180007647.5.

Office Action issued Apr. 25, 2023 in Japanese Application No. 2022-534307.

* cited by examiner

WRAPPER FOR AEROSOL GENERATING ARTICLE AND METHOD OF MANUFACTURING SAME

TECHNICAL FIELD

Various embodiments according to the present disclosure relate to an inner wrapper included in an aerosol generating article and a method of manufacturing the same.

BACKGROUND ART

In recent years, demand for an alternative method that overcomes disadvantages of general cigarettes has increased. For example, there is growing demand for an aerosol generating device that generates aerosols by heating aerosol generating materials in cigarettes without combustion. Accordingly, studies on heating-type cigarettes or heating-type aerosol generating devices are actively being conducted.

DISCLOSURE OF INVENTION

Technical Problem

There is a need for a wrapper which improves the performance of an aerosol generating article in various aspects of smoking such as amount of vapor, temperature of vapor, surface temperature of the aerosol generating article, taste of smoke, etc. Technical problems to be solved by the present disclosure are not limited to the technical problems described above, and other technical problems may be inferred from following embodiments.

Solution to Problem

A first aspect of the present disclosure may provide a method of manufacturing a wrapper for an aerosol generating article, the method comprising: attaching a first paper layer to one surface of a metal layer using an adhesive; attaching a second paper layer to another surface of the metal layer using the adhesive; drying the adhesive applied between the metal layer and the first paper layer; and drying the adhesive applied between the metal layer and the second paper layer.

A second aspect of the present disclosure may provide a wrapper for an aerosol generating article, the wrapper including a metal layer, a first paper layer attached to one surface of the metal layer using an adhesive, and a second paper layer attached to the other surface of the metal layer using an adhesive.

A third aspect of the present disclosure may provide an aerosol generating article including a first portion including an aerosol generating material, a second portion including a tobacco material, a third portion including a cooling element, a fourth portion including a filter element, and a wrapper wrapped around at least a part of the first portion or at least a part of the second portion, wherein the wrapper includes the wrapper according to the second aspect.

Advantageous Effects of Invention

According to various embodiments of the present disclosure, an adhesive force of a wrapper including a first paper layer, a metal layer, and a second paper layer increases, and thus retractability of the aerosol generating article may be improved and a manufacturing process may be eased.

In addition, according to various embodiments of the present disclosure, a wrapper including a first paper layer, a metal layer, and a second paper layer may increase a taste of smoke through uniform heat transfer.

Effects of the present disclosure are not limited to the above description and may include all effects that may be inferred from the configurations to be described below.

BEST MODE FOR CARRYING OUT THE INVENTION

Figure 1:
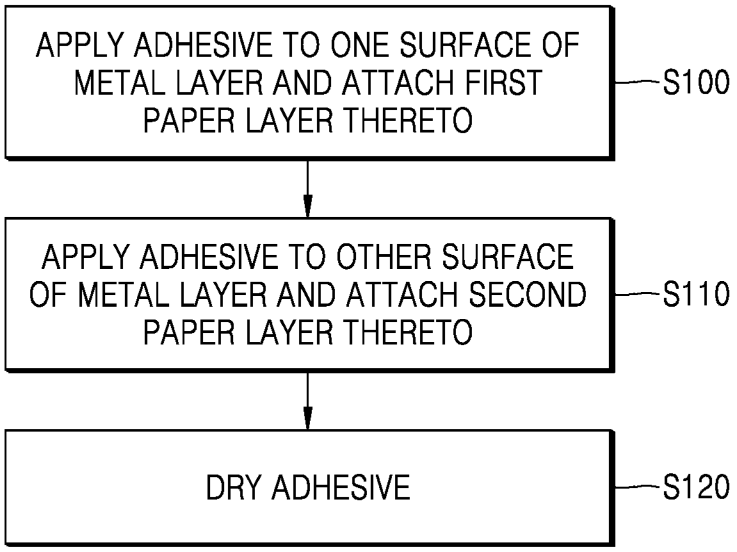
FIG. 1 is a flowchart illustrating a method of manufacturing a wrapper according to an embodiment.

With respect to terms used to describe various embodiments, general terms which are currently and widely used are selected in consideration of functions of structural elements in the various embodiments of the present disclosure. However, meanings of the terms may be changed according to intention, a judicial precedence, appearance of a new technology, and so on. In addition, in a specific case, there is a term randomly selected by the applicant, and in this case, the meaning will be described in detail in the description of the corresponding invention. Therefore, terms used in the present disclosure should be defined based on meanings of the terms and contents of the present disclosure, rather than simple names of the terms.

Unless explicitly described to the contrary, a word "comprise" or "include" and variations such as "comprises" or "comprising" will be understood to imply inclusion of the stated elements but not exclusion of any other elements. In addition, terms "-er", "-or", and "module" described in the specification mean units for processing at least one function and/or operation and may be implemented by hardware components or software components and combinations thereof.

As used herein, expressions such as “at least one of,” when preceding a list of elements, modify the entire list of elements and do not modify the individual elements of the list. For example, the expression. “at least one of a, b, and c,” should be understood as including only a, only b, only c, both a and b, both a and c, both b and c, or all of a, b, and c.

In addition, in the present disclosure, an “aerosol generating device” may refer to a device that generates an aerosol from an aerosol generating material that may be directly inhaled into a user’s lungs through the user’s mouth.

In addition, in the present disclosure, a “tobacco element” indicates an element including a tobacco material, and the “tobacco material” indicates any type of material including a component derived from tobacco leaves.

The term “aerosol generating article” may refer to a product designed for smoking by a person puffing on the aerosol generating article. The aerosol generating article may include an aerosol generating material that generates aerosols without combustion. For example, one or more aerosol generating articles may be loaded in an aerosol generating device and generate aerosols when heated by the aerosol generating device. The shape, size, material, and structure of the aerosol generating article may differ according to embodiments. Examples of the aerosol generating article may include, but are not limited to, a cigarette-shaped substrate and a cartridge. Hereinafter, the term “cigarette” (i.e., when used alone without a modifier such as “general,” “traditional,” or “combustive”) may refer to an aerosol generating article which has a shape and a size similar to those of a traditional combustive cigarette.

Hereinafter, embodiments of the present disclosure will be described more fully with reference to the accompanying drawings, in which example embodiments of the present disclosure are shown such that the person skilled in the art may easily perform the present disclosure. However, the embodiments of the present disclosure may be implemented in various different forms and are not limited to the embodiments described in the present disclosure.

Throughout the specification, an “embodiment” is a certain division for easily describing the invention in the present disclosure, and each of the embodiments need not be mutually exclusive. For example, components disclosed in one embodiment may be applied and/or implemented in other embodiments and may be changed and applied and/or implemented without departing from the scope of the present disclosure.

In addition, the terms used in the present disclosure are for describing the embodiments and are not intended to limit the present embodiments. In the present disclosure, the singular also includes the plural unless otherwise specified.

FIG. 1 is a flowchart illustrating a method of manufacturing a wrapper according to an embodiment.

Referring to FIG. 1, a first aspect of the present disclosure includes a step S100 of applying an adhesive to one surface of a metal layer and attaching a first paper layer thereto, a step S110 of applying the adhesive to the other surface of the metal layer and attaching a second paper layer thereto, and a step S120 of drying the adhesive.

In step S100 of applying the adhesive to the one surface of the metal layer and attaching the first paper layer thereto, the first paper layer may have a basis weight ranging from about 16 g/m$^2$ to about 35 g/m$^2$. As the basis weight of the first paper layer corresponds to the range from about 16 g/m$^2$ to about 35 g/m$^2$, easiness of a manufacturing process may be increased. Otherwise, when the basis weight of the first paper layer is about 16 g/m$^2$ or less, a paper material may be cut during the manufacturing process. On the other hand, when the basis weight of the first paper layer is about 35 g/m$^2$ or more, manufacturing workability may be reduced as a manufacturing speed decreases and adhesiveness is reduced.

In one embodiment, an adhesive applied to one surface of a metal layer may correspond to ethylene-vinyl acetate copolymer (EVA). The EVA does not include a solvent harmful to a human body. Accordingly, as the first paper layer is attached to a metal layer through the EVA, a user may be safe. However, the present disclosure is not limited to the above description and may include all types of adhesives known in the art.

In one embodiment, an adhesive may have a solid content of about 60% or more. In this case, a drying temperature may be appropriately adjusted during step S120 of drying an adhesive.

During step S110 of applying an adhesive to the other surface of a metal layer and attaching thereto a second paper layer different from the first paper layer, the second paper layer may have a basis weight ranging from about 16 g/m$^2$ to about 35 g/m$^2$. As the basis weight of the second paper layer corresponds to the range from about 16 g/m$^2$ to about 35 g/m$^2$, easiness of a manufacturing process may be increased.

The first paper layer and the second paper layer respectively attached to one surface and the other surface of a metal layer may have the same basis weight or may have different basis weights from each other. For example, the first paper layer and the second paper layer may have the same basis weight of about 30 g/m$^2$. In another example, the first paper layer may have a basis weight of about 16 g/m$^2$, and the second paper layer may have a basis weight of about 35 g/m$^2$.

TABLE 1

| Classification | First condition | Second condition | Third condition |
|---|---|---|---|
| Manufacturing speed | over 3,000 m/min | 2,500 m/min (maximum) | Not manufacturable |
| Frequency of wrinkles | High | Low | — |
| Adhesive force | — | High | Low |

Referring to Table 1, a wrapper may be manufactured at a speed of 3,000 m/min or more under a first condition (a basis weight of the first paper layer: 16 g/m$^2$, a thickness of a metal layer: 20 μm, a basis weight of the second paper layer: 16 g/m$^2$). However, in this case, a wrapper manufactured under the first condition may have a high frequency of wrinkles because the first paper layer and the second paper layer have the same the basis weight of 16 g/m. In one embodiment, a wrapper may be manufactured at a speed of up to 2,500 m/min under a second condition (a basis weight of the first paper layer: 35 g/m$^2$, a thickness of a metal layer: 20 μm, a basis weight of the second paper layer: 16 g/m$^2$). That is, when the basis weight of the first paper layer is 16 g/m$^2$ (a minimum value of a basis weight range) and the basis weight of the second paper layer is 35 g/m$^2$ (a maximum value of a basis weight range), the wrapper manufactured under the second condition may have a low frequency of wrinkles. In addition, in the wrapper manufactured under the second condition, moisture contained in an adhesive may be evaporated during a manufacturing process. Accordingly, an adhesive force of the wrapper manufactured under the second condition may be increased.

A third condition (a basis weight of the first paper layer: 35 g/$m^2$, a thickness of a metal layer: 20 μm, a basis weight of the second paper layer: 35 g/$m^2$) may not be a suitable condition for manufacturing a wrapper. In the wrapper manufactured under the third condition, moisture contained in the adhesive may not be properly evaporated during the manufacturing process. Accordingly, an adhesive force of the wrapper manufactured under the third condition may be reduced.

The first paper layer and the second paper layer respectively attached to one surface and the other surface of a metal layer may have the same thickness or may have different thicknesses from each other. For example, the first paper layer and the second paper layer may have the same thickness of about 35 μm. In another example, the first paper layer may have a thickness of about 35 μm, and the second paper layer may have a thickness of about 44 μm.

A metal layer may have a thickness ranging from about 6.3 μm to about 20 μm. More preferably, the metal layer may have a thickness ranging from about 15 μm to about 20 μm. When the metal layer has a thickness ranging from about 15 μm to about 20 μm, thermal conductivity is highest, and thus an improved taste of smoke may be provided to a user.

The metal layer may include any one of aluminum (Al), gold (Au), and silver (Ag). For example, the metal layer may include a metal foil formed of an aluminum material. However, the metal layer is not limited to the material described above and may include various materials with high thermal conductivity.

The first paper layer and the second paper layer respectively attached to one surface and the other surface of the metal layer may be formed of the same paper material or may be formed of different paper materials.

During step S120 of drying the adhesive applied between the metal layer and the first paper layer and the adhesive applied between the metal layer and the second paper layer, the adhesive may be dried through hot air drying. For example, when a solid content of the adhesive is about 60% or more, the adhesive may be dried through hot air drying at a temperature of about 60° C. to about 75° C. Specifically, the adhesive may also be dried through hot air drying at a temperature of about 63° C. to about 67° C. However, the drying method is not limited to hot air drying, and various drying methods of removing moisture contained in an adhesive (for example, curing according to a chemical reaction) may be adopted.

Figure 2A:
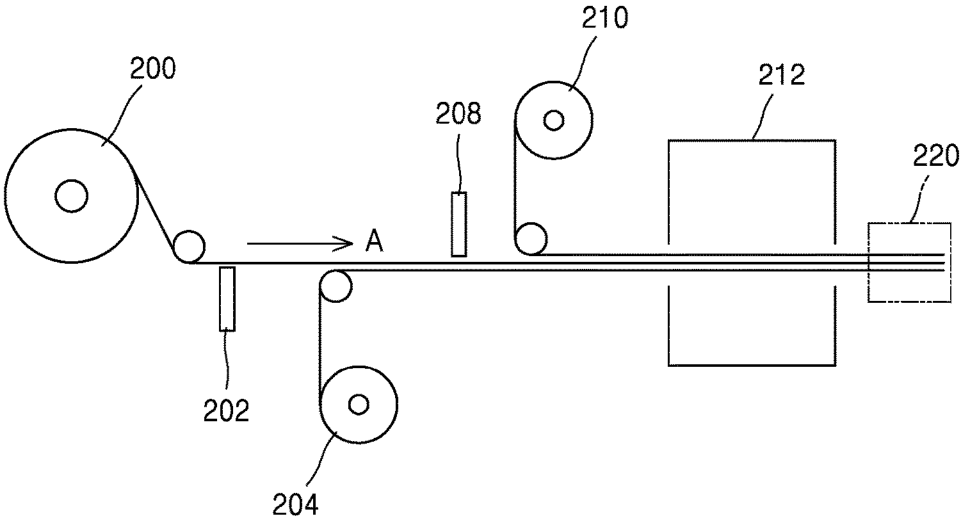
FIG. 2A illustrates a process of manufacturing a wrapper according to one embodiment.

FIG. 2A illustrates a process of manufacturing a wrapper according to one embodiment.

Referring to FIG. 2A, the process of manufacturing a wrapper may start by providing a material corresponding to a metal layer 200. An adhesive may be applied to one surface of the metal layer 200 by an adhesive application device 202.

In one embodiment, the adhesive application device 202 may include a roller-type device. For example, when the metal layer 200 is provided in the direction A, a roller immersed in the adhesive may rotate clockwise to correspond to the direction A. As the roller immersed in the adhesive rotates clockwise, the adhesive may be uniformly applied to one surface of the metal layer 200. However, the adhesive application device 202 is not limited to a roller method, and various application methods (for example, a spray method, and so on) may be adopted.

As the metal layer 200 having one surface coated with an adhesive is provided in the direction A, a first paper layer 204 may be attached to the one surface.

As the metal layer 200 having one surface to which the first paper layer is attached is provided in the direction A, an adhesive may be applied to the other surface of the metal layer 200 by an adhesive application device 208. The adhesive application device 208 may include a roller-type device like the adhesive application device 202 but is not limited thereto.

As the metal layer 200 having the other surface coated with an adhesive is provided in the direction A, a second paper layer 210 may be attached to the other surface.

As the metal layer 200 having one surface to which the first paper layer is attached and the other surface to which the second paper layer is attached is provided in the direction A, the applied adhesive may be dried by a drying device 212. The drying device 212 may dry moisture contained in an adhesive by providing hot air at a high temperature. For example, the drying device 212 may provide hot air of about 60° C. to about 75° C. Specifically, the drying device 212 may provide hot air of about 63° C. to about 67° C.

With hot air of about 60° C. to about 75° C., the first paper layer and the second paper layer may be quickly attached to the metal layer. For example, a manufacturing speed may correspond to about 2,500 m/min to about 3,000 m/min. In order to increase the manufacturing speed, the first paper layer and the second paper layer need to be quickly attached to the metal layer. When a solid content of an adhesive is about 60% or more, the adhesive may be properly dried with a drying temperature of about 60° C. to about 75° C.

As the moisture contained in the adhesive dries, the wrapper 220 may be manufactured in which the first paper layer, the metal layer, and the second paper layer are sequentially stacked.

Figure 2B:
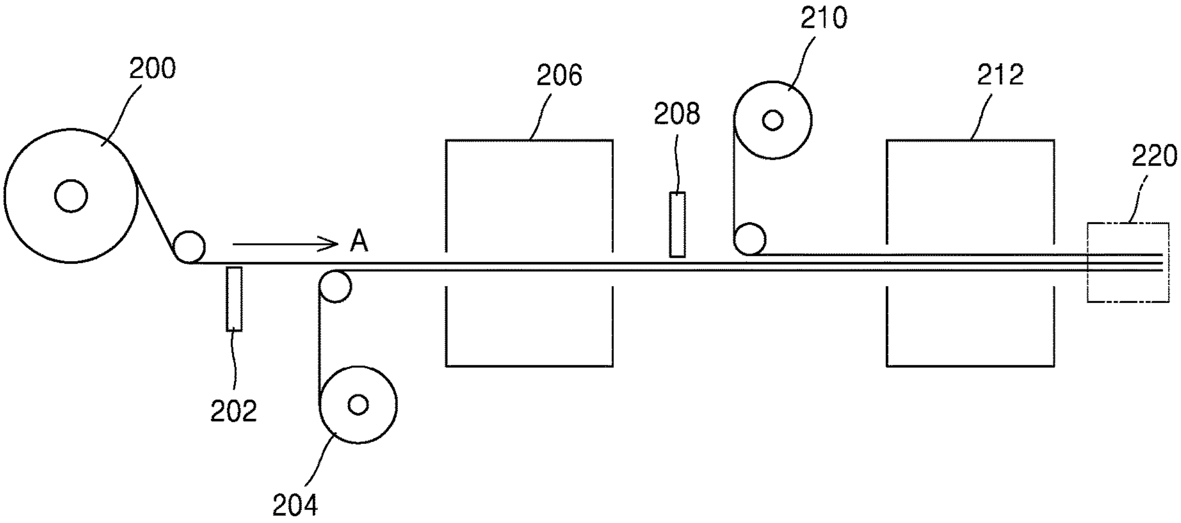
FIG. 2B illustrates a process of manufacturing a wrapper according to another embodiment.

FIG. 2B illustrates a process of manufacturing a wrapper according to another embodiment.

Referring to FIG. 2B, the process of manufacturing a wrapper may start by providing a material corresponding to the metal layer 200. An adhesive may be applied to one surface of the metal layer 200 through an adhesive application device 202. As the metal layer 200 having one surface coated with an adhesive is provided in the direction A, the first paper layer 204 may be attached to the one surface.

Unlike FIG. 2A, in FIG. 2B, the metal layer 200 having one surface to which the first paper layer is dried by a drying device 206 before the adhesive is applied to the other surface of the metal layer 200. By drying the adhesive applied between the metal layer 200 and the first paper layer ahead, an adhesive force between the metal layer 200 and the first paper layer may be increased.

For example, even if a manufacturing speed in the process of FIG. 2B is slower than the manufacturing speed in the process of FIG. 2A, the overall adhesive force may increase because an adhesive applied between the metal layer 200 and the first paper layer is immediately without being delayed until after the second paper layer is attached to the other surface of the metal layer 200.

Figure 3A:
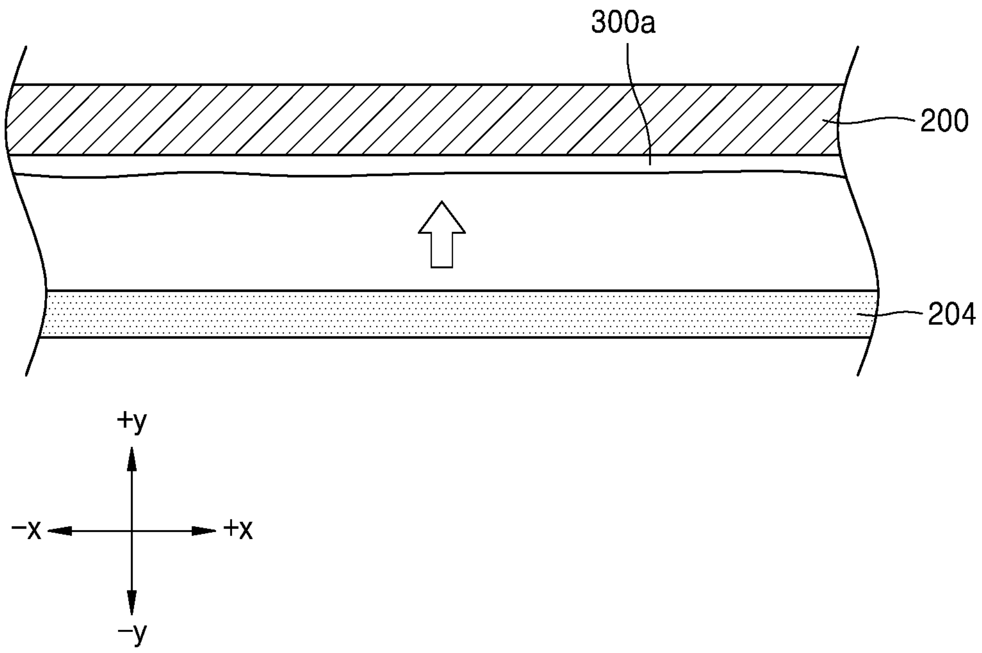
FIG. 3A is a cross-sectional view illustrating a first step of manufacturing a wrapper where a first paper layer is attached to a metal layer, according to an embodiment.
Figure 3B:
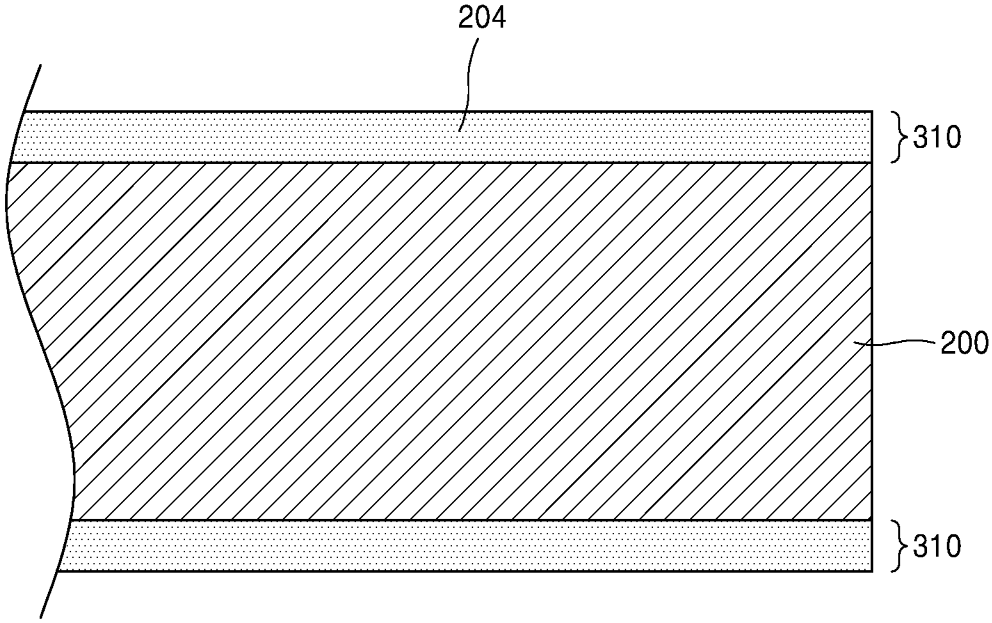
FIG. 3B illustrates the wrapper of FIG. 3A viewed in a −y direction.

FIG. 3A is a cross-sectional view illustrating a first step of manufacturing a wrapper where a first paper layer is attached to a metal layer, according to an embodiment. FIG. 3B illustrates the wrapper of FIG. 3A viewed in the −y direction.

Referring to FIGS. 3A and 3B, during the first step of manufacturing the wrapper, the first paper layer 204 may be attached to one surface of the metal layer 200 after an adhesive 300*a* is applied on the one surface. In this case, a width of the first paper layer 204 may be greater than a width of the metal layer 200.

For example, the first paper layer 204 may include a region 310 extending in a width direction beyond the metal layer 200. For example, when the width of the metal layer 200 is 770 mm, the first paper layer 204 may be 780 mm such that the first paper layer 204 includes the regions 310 extending 5 mm from both edges of the metal layer 200.

Figure 4:
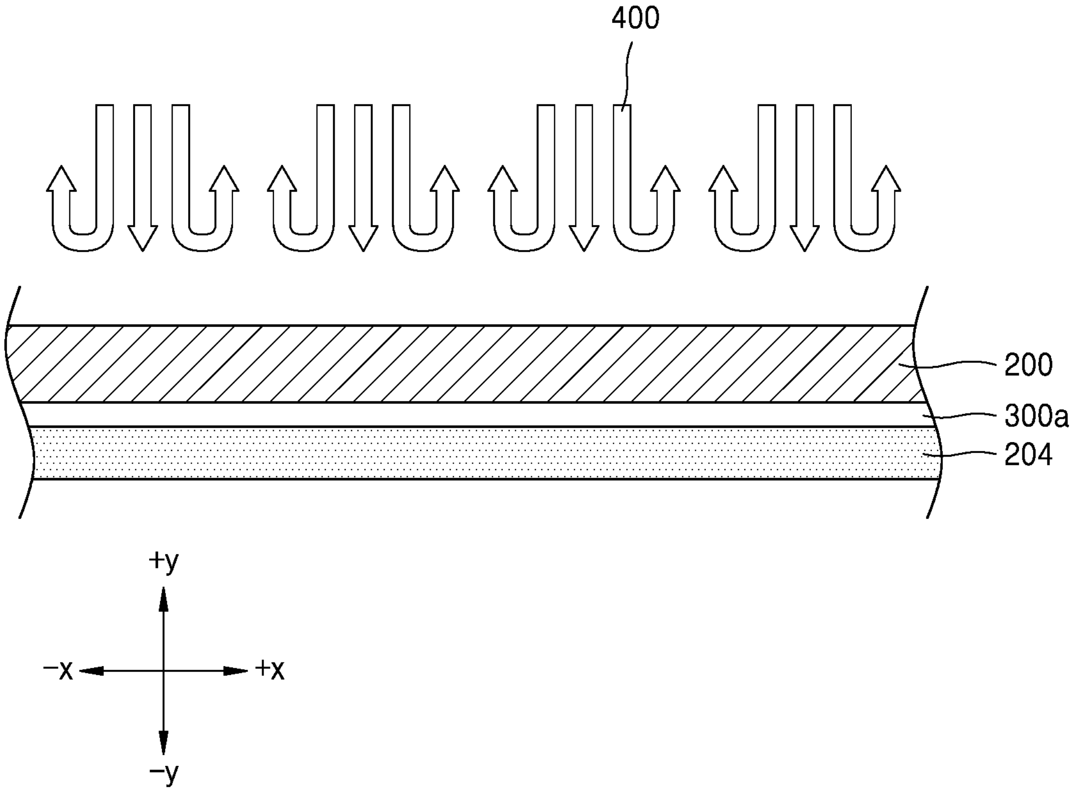
FIG. 4 is a cross-sectional view illustrating a second step of manufacturing a wrapper where an adhesive between a first paper layer and a metal layer is dried, according to an embodiment.

FIG. 4 is a cross-sectional view illustrating a second step of manufacturing a wrapper where an adhesive between a first paper layer and a metal layer is dried, according to an embodiment.

Referring to FIG. 4, during the second step of manufacturing the wrapper, the adhesive 300*a* may be dried by hot air 400 after the first paper layer 204 is attached to one surface of the metal layer 200. In this case, the temperature of the hot air 400 may range from about 60° C. to about 75° C. For example, the temperature of the hot air 400 may correspond to a range from about 63° C. to about 67° C. When the temperature of the hot air 400 is less than about 60° C. (for example, about 50° C.), moisture contained in the adhesive 300*a* is not removed well. As a result, an adhesive force thereof is reduced, and the first paper layer 204 may be easily separated from the metal layer 200.

FIG. 4 corresponds to a step in which the adhesive 300*a* is dried before the second paper layer 204 is attached to the metal layer as in the manufacturing process of FIG. 2B. In the manufacturing process of FIG. 2A, however, the second step of manufacturing the wrapper shown in FIG. 4 may be omitted.

Figure 5A:
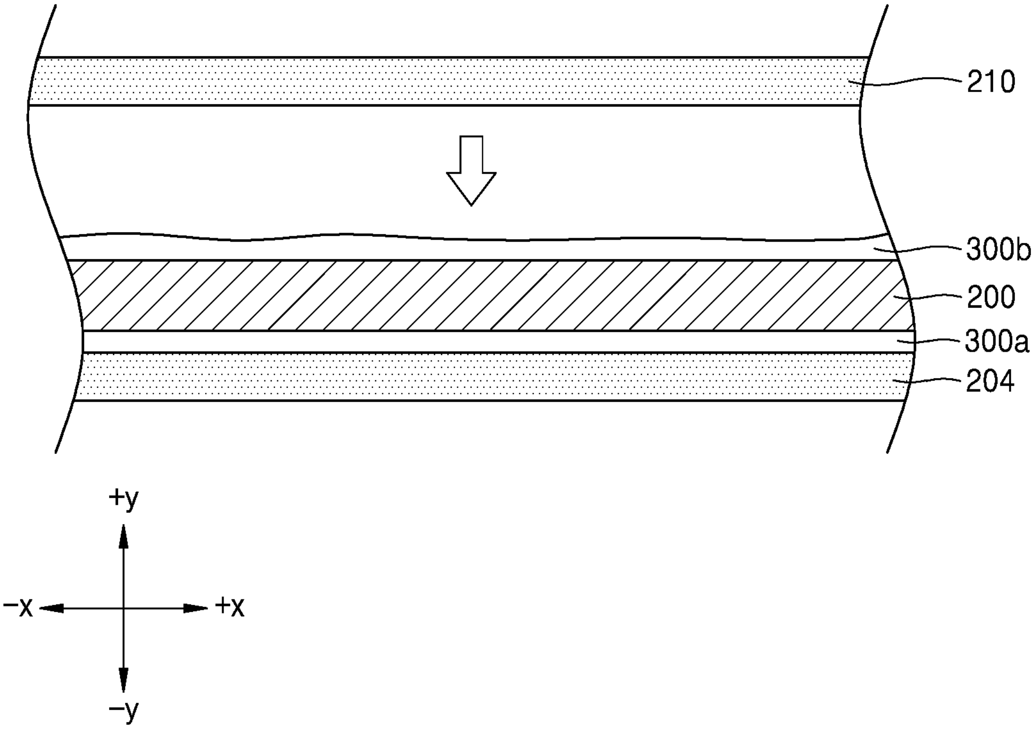
FIG. 5A is a cross-sectional view illustrating a third step of manufacturing a wrapper where a second paper layer is attached to a metal layer, according to an embodiment.
Figure 5B:
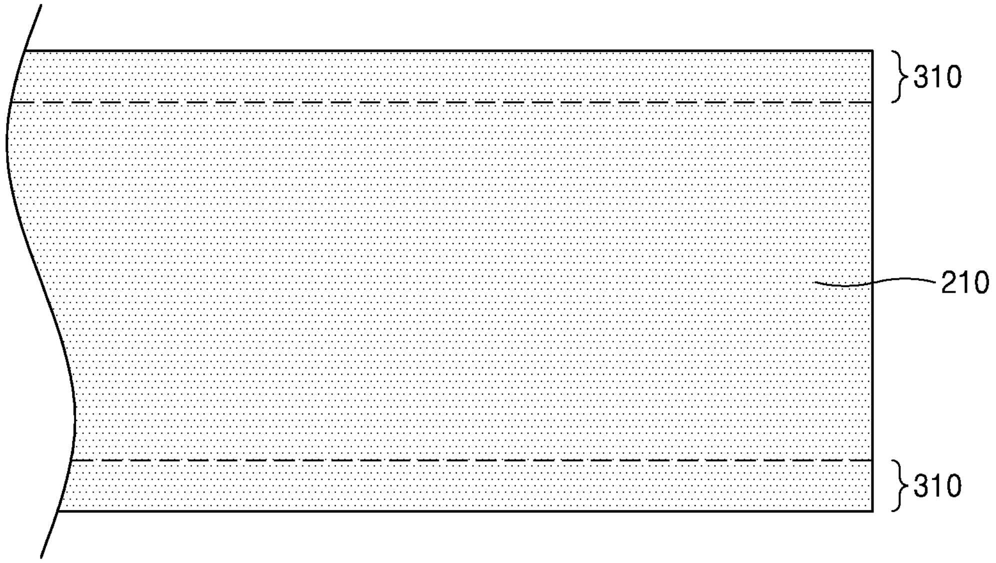
FIG. 5B illustrates the wrapper of FIG. 5A viewed in the −y direction.

FIG. 5A is a cross-sectional view illustrating a third step of manufacturing a wrapper where a second paper layer is attached to a metal layer, according to an embodiment. FIG. 5B illustrates the wrapper of FIG. 5A viewed in the −y direction.

Referring to FIGS. 5A and 5B, during the third step of manufacturing the wrapper, the second paper layer 210 may be attached to the metal layer 200 after an adhesive 300*b* is applied to the other surface of the metal layer 200. In this case, a width of the second paper layer 210 may be greater than a width of the metal layer 200. In addition, the width of the second paper layer 210 may be substantially equal to the width of the first paper layer 204.

As shown in FIG. 5B, the second paper layer 210 may include regions 310 extending in a width direction beyond the metal layer 200. For example, when the width of the metal layer 200 is 770 mm, the second paper layer 210 may be 780 mm such that the second paper layer 210 includes the regions 310 extending 5 mm from both edges of the metal layer 200. In addition, the width of the first paper layer 204 is substantially the same as the width of the second paper layer 210, and thus the first paper layer 204 and the second paper layer 210 may have highest tension. Accordingly, the frequency of wrinkles that may occur during a process of manufacturing a wrapper may be reduced.

Figure 6:
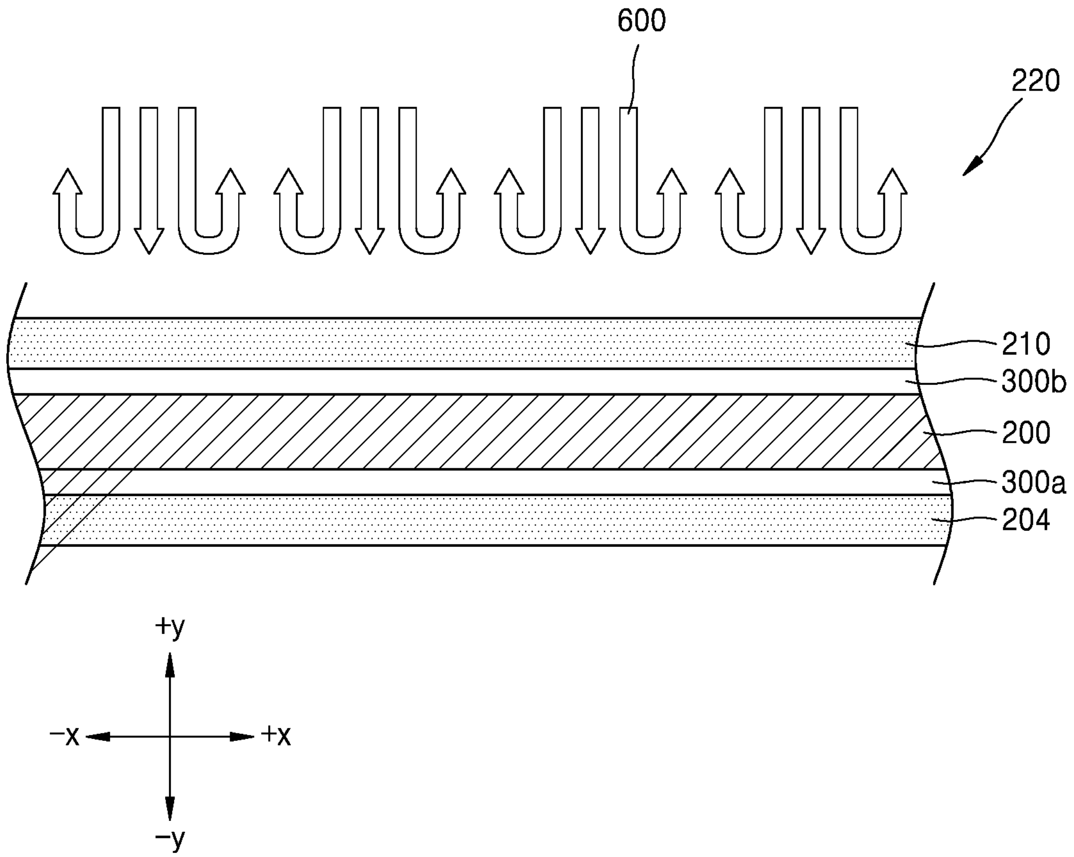
FIG. 6 is a cross-sectional view illustrating a fourth step of manufacturing a wrapper where an adhesive between a second paper layer and a metal layer is dried according to an embodiment.

FIG. 6 is a cross-sectional view illustrating a fourth step of manufacturing a wrapper where an adhesive between a second paper layer and a metal layer is dried, according to an embodiment.

Referring to FIG. 6, during the fourth step of manufacturing the wrapper, an adhesive 300*b* may be dried by hot air 600 after the second paper layer 210 is attached to the other surface of the metal layer 20X. In this case, the temperature of the hot air 600 may range from about 60° C. to about 75° C. For example, the temperature of the hot air 600 may range from about 63° C. to about 67° C.

The adhesives 300*a* and 300*b* may also be simultaneously dried by the hot air 600 in the manufacturing process of FIG. 2A.

As moisture contained in the adhesive 300*a* and/or the adhesive 300*b* is dried by the hot air 60, a threefold wrapper 220 including the first paper layer 204, the metal layer 200, and the second paper layer 210 may be formed.

In describing FIGS. 3A to 6, the same descriptions that have been provided with reference to FIGS. 1, 2A, and 2B are omitted.

Figure 7A:
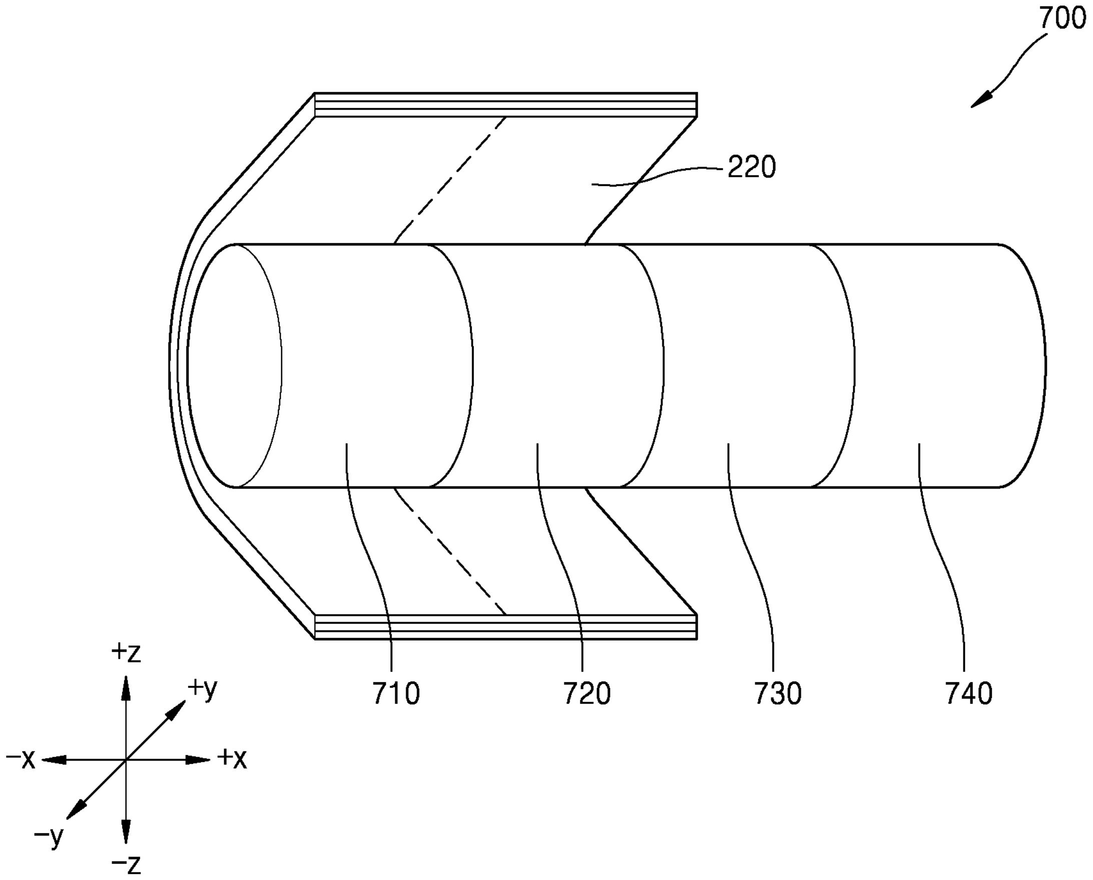
FIG. 7A illustrates an aerosol generating article including a wrapper, according to an embodiment.
Figure 7B:
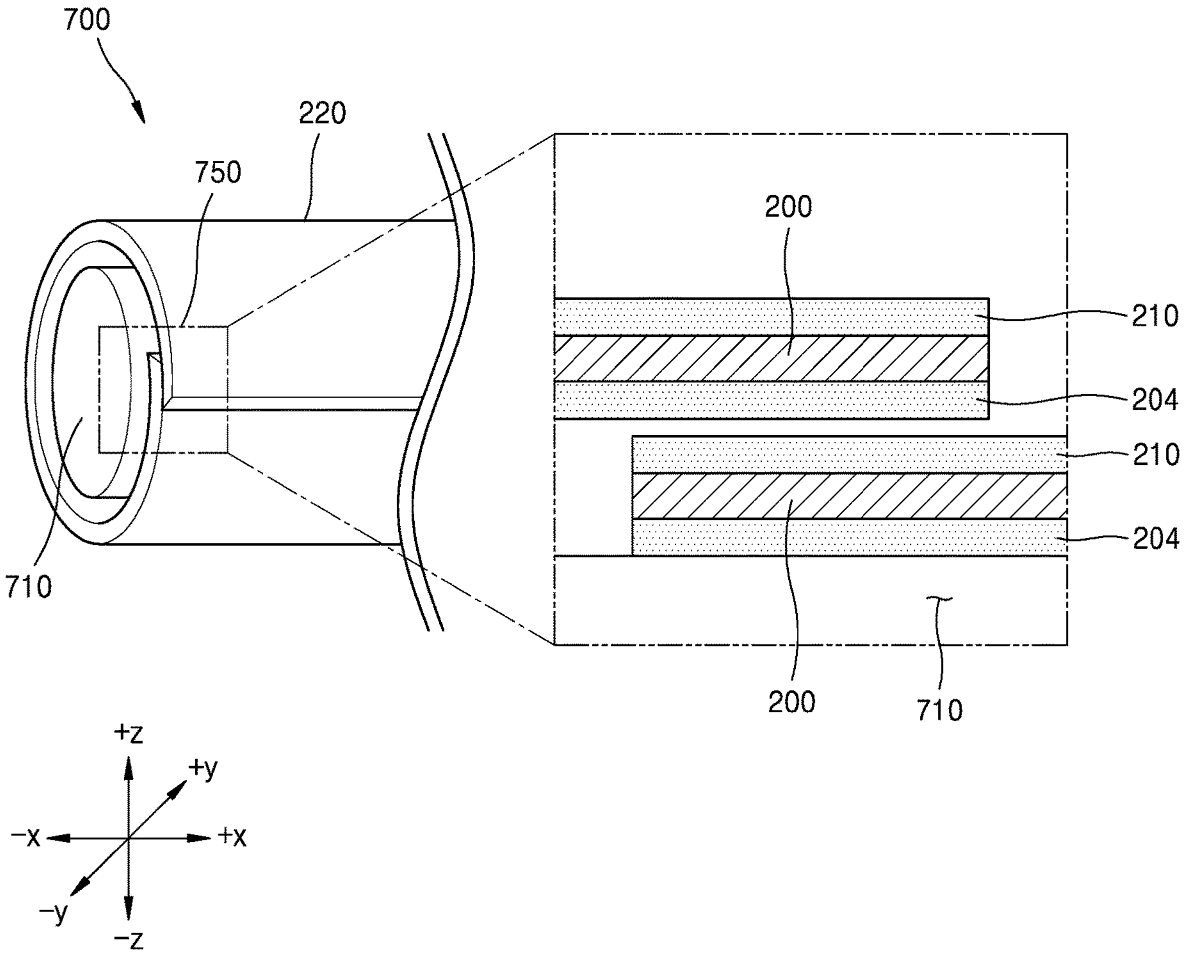
FIG. 7B illustrates an overlapping joint portion of a wrapper, according to an embodiment.

FIG. 7A illustrates an aerosol generating article including a wrapper, according to an embodiment. FIG. 7B illustrates an overlapping joint portion of a wrapper, according to one embodiment.

Referring to FIG. 7A, an aerosol generating article 700 may include a first portion 710, a second portion 720, a third portion 730, a fourth portion 740, and the threefold wrapper 220.

The first portion 710 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol but is not limited thereto.

The second portion 720 may include a tobacco material. For example, the tobacco material may include at least one of a tobacco leaf, a tobacco lateral vein, puffed tobacco, cut tobacco, cut plate leaf, and reconstituted tobacco but is not limited thereto. In addition, the tobacco material may further include any one of a savoring agent, a wetting agent, an additive material such as organic acid, a flavored material, and a mixture thereof.

The third portion 730 may include a cooling element. For example, the cooling element may cool an airflow that has passed through the first portion 710 and the second portion 720. The cooling element may include a cylindrical paper tube that is formed of a paper material and includes a cavity.

The fourth portion 740 may include a filter element. For example, the filter element may include a cellulose acetate filter. A shape of the filter element is not limited. For example, the filter element may include a cylindrical rod or may also include a tubular rod having a cavity therein. In addition, the filter element may also include a recess-type rod. According to an embodiment, the filter element may include a plurality of segments, and at least one of the plurality of segments may also be manufactured to have a different shape.

The threefold wrapper 220 may be wrapped around at least a portion of the first portion 710 and/or at least a portion of the second portion 720. For example, a first wrapper may be wrapped around the first portion 710, a second wrapper may be wrapped around the second portion 720, and the threefold wrapper 220 may be wrapped around the first wrapper and the second wrapper. In another example, the threefold wrapper 220 may be directly wrapped around the first portion 710 and the second portion 720.

In addition, the aerosol generating article 700 may include an outer wrapper (not illustrated) wrapped around the first portion 710, the second portion 720, the third portion 730, and the fourth portion 740, independently from the triple wrapper 220. The outer wrapper may be wrapped around the triple wrapper 220 such that an outer surface of the triple wrapper 220 is in contact with an inner surface of the outer wrapper.

Referring to FIG. 7B, when at least a portion of the first portion 710 is wrapped by the threefold wrapper 220, the threefold wrapper 220 may include an overlapping joint portion 750.

The overlapping joint portion 750 may be a region formed by winding of the threefold wrapper 220. When the aerosol generating article 700 is viewed in the +x direction, the first paper layer 204 may be arranged to be in contact with an outer circumferential surface of at least a part of the first portion 710. In this case, the first paper layer 204 may correspond to an inner surface of the threefold wrapper 220 and the second paper layer 210 may correspond to an outer surface thereof. That is, the overlapping joint portion 750 may be formed by overlapping a part of the first paper layer 204 with a part of the second paper layer 210. The first paper layer 204 and the second paper layer 210 may be bonded to each other by an adhesive. In this case, since the first paper layer 204 and the second paper layer 210 have a friction coefficient of a paper material, an adhesive force of the overlapping joint portion 750 may be increased.

Figure 8:
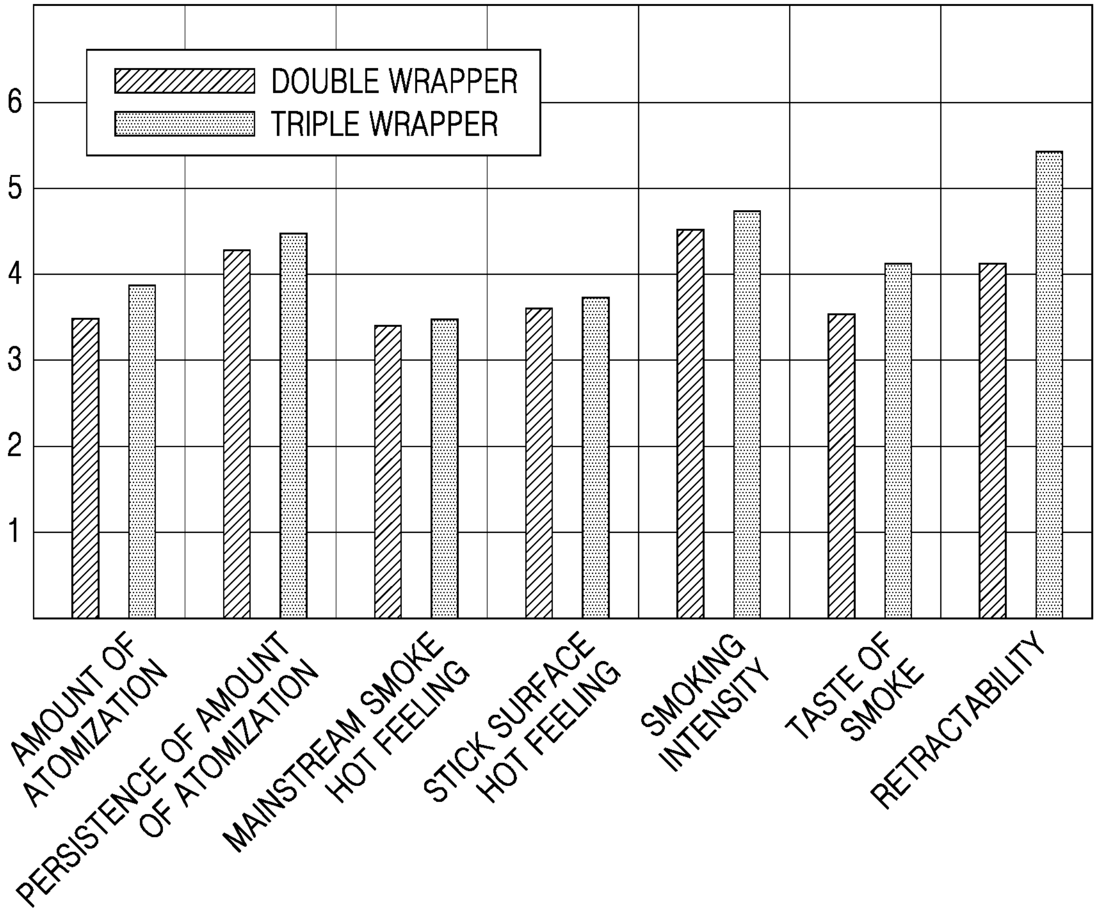
FIG. 8 is a graph illustrating improved performance of a wrapper including a first paper layer and a second paper layer, according to an embodiment.

FIG. 8 is a graph illustrating improved performance of a wrapper including a first paper layer and a second paper layer.

Referring to FIG. 8, various factors of smoking satisfaction have been evaluated for a double wrapper including a paper layer and a metal layer and a threefold wrapper including a first paper layer, the metal layer, and a second paper layer. The evaluation was performed by 20 expert panelists based on a scale of 7 points.

The amount of atomization refers to the amount of the vapor generated from an aerosol generating article. As the amount of atomization increases, smoking satisfaction of a user may also increase. Referring to FIG. 8, in evaluating the amount of atomization, the double rapper is given 3.64 points and the threefold rapper is given 3.94 points. Thus, it can be seen that the threefold wrapper may increase the amount of atomization when compared to the double wrapper.

In evaluating the persistence of the amount of atomization, the double rapper is given 4.24 points, and the threefold rapper is given 4.42 points. Thus, it can be seen that the threefold wrapper may improve the persistence of the amount of atomization when compared to the double wrapper.

In evaluating the mainstream smoke hot feeling and the stick surface hot feeling, the double rapper is given 3.61 points and 3.75 points, respectively. On the other hand, the threefold rapper is given 3.64 points and 3.78 points, respectively. Therefore, it can be seen that the threefold wrapper may reduce the temperatures of the mainstream smoke and the stick (e.g., a cigarette) when compared to the double wrapper.

In evaluating the smoking intensity and the taste of smoke, the double rapper is given 4.57 points and 3.68 points, respectively. On the other hand, the threefold rapper is given 4.84 points and 4.12 points, respectively. Accordingly, it can be seen that the threefold wrapper may improve the smoking intensity and the taste of smoke when compared to the double wrapper.

In evaluating the retractability related to a tensile strength (i.e., mechanical strength) of a material, the double wrapper is given the level of 4.13 points, and the threefold wrapper is given the level of 5.38 points. Thus, it can be seen that the threefold wrapper may greatly improve the retractability when compared to the double wrapper.

Figure 9:
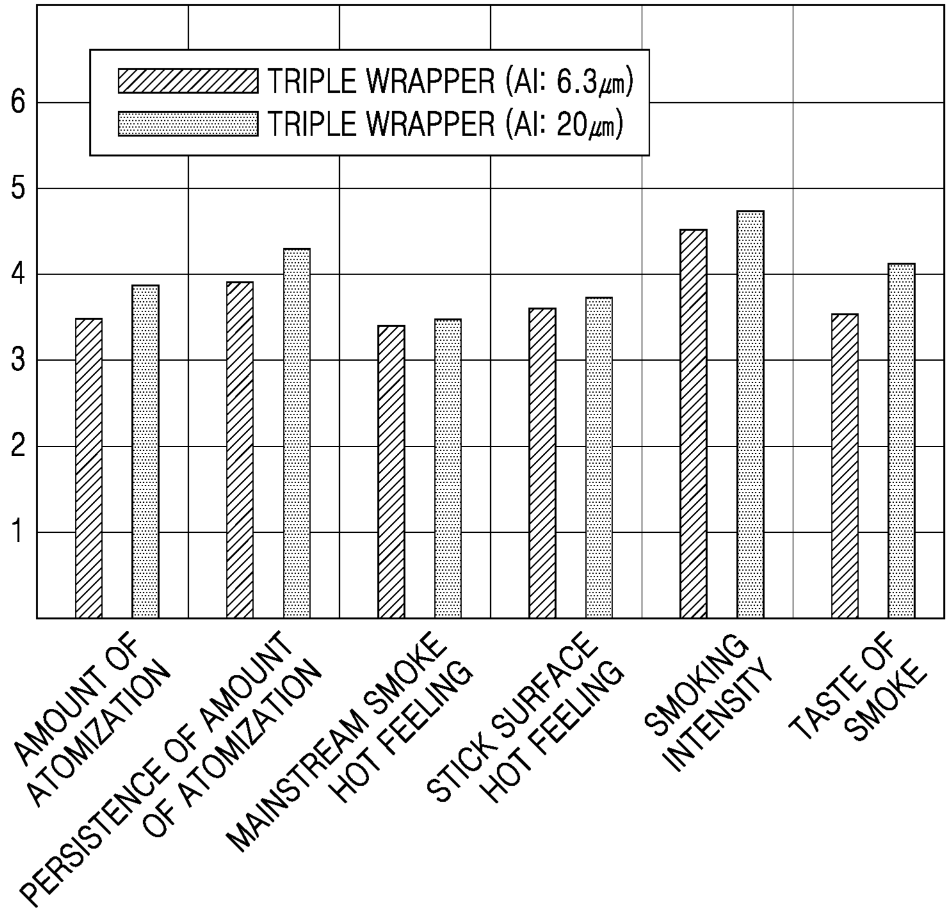
FIG. 9 is a graph illustrating comparison results of wrappers depending on the thickness of a metal layer.

FIG. 9 is a graph illustrating comparison results of wrappers with different thickness of a metal layer.

Referring to FIG. 9, various factors of smoking satisfaction have been evaluated for the threefold wrapper having a metal layer thickness of 6.3 μm and the threefold wrapper having a metal layer thickness of 20 μm. The evaluation was performed by 20 expert panelists as in FIG. 8.

As a result of calculating scores submitted by the expert panelists, it can be seen that the threefold wrapper having a metal layer thickness of 20 μm is improved in all evaluation criteria when compared to the threefold wrapper having a metal layer thickness of 6.3 μm.

A person skilled in the art related to the present embodiments will understand that the present embodiments may be implemented in modified forms without departing from the essential characteristics of the above descriptions. Therefore, the disclosed methods should be considered in a descriptive sense rather than a restrictive sense. The scope of the present embodiments is indicated in the claims rather than the above descriptions, and all differences within an equivalent range should be construed as being included in the present embodiments.

The invention claimed is:

1. A method of manufacturing a wrapper for an aerosol generating article, the method comprising:
- attaching a first paper layer to one surface of a metal layer using an adhesive;
- attaching a second paper layer to another surface of the metal layer using the adhesive;
- drying the adhesive applied between the metal layer and the first paper layer; and
- drying the adhesive applied between the metal layer and the second paper layer,
- wherein a width of the first paper layer and a width of the second paper layer are respectively greater than a width of the metal layer,
- wherein the first paper layer and the second paper layer extend beyond both edges of the metal layer in the width direction, and
- wherein the width of the first paper layer is a same width as the width of the second paper layer.

2. The method of claim 1, wherein the drying of the adhesive applied between the metal layer and the first paper layer is performed before the second paper layer is attached to the other surface of the metal layer using the adhesive.

3. The method of claim 1, wherein the drying of the adhesive between the metal layer and the first paper layer and the drying of the adhesive between the metal layer and the second paper layer are performed with hot air at a temperature of 60° C. to 75° C.

4. The method of claim 1, wherein the drying of the adhesive between the metal layer and the first paper layer and the drying of the adhesive between the metal layer and the second paper layer are performed with hot air at a temperature of 63° C. to 67° C.

5. The method of claim 1, wherein the metal layer includes any one of aluminum (Al), gold (Au), and silver (Ag).

6. The method of claim 1, wherein the metal layer has a thickness of 6.3 μm to 20 μm.

7. The method of claim 1, wherein the metal layer has a thickness of 15 μm to 20 μm.

8. The method of claim 1, wherein basis weights of the first paper layer and the second paper layer range from 16 $g/m^2$ to 35 $g/m^2$.

9. The method of claim 1, wherein a basis weight of the first paper layer is different from a basis weight of the second paper layer.

10. The method of claim 9, wherein the basis weight of the first paper layer is 16 g/$m^2$, and the basis weight of the second paper layer is 35 g/$m^2$.

11. The method of claim 1, wherein the adhesive is an ethylene-vinyl acetate copolymer (EVA).

12. The method of claim 11, wherein the adhesive has a solid content of at least 60%.

* * * * *